(12) United States Patent
Gong et al.

(10) Patent No.: US 12,479,756 B2
(45) Date of Patent: Nov. 25, 2025

(54) METHODS, VACUUM INSULATED GLAZING UNITS PRODUCED THEREBY, AND SEALANTS

(71) Applicant: JELD-WEN, Inc., Charlotte, NC (US)

(72) Inventors: Yuxuan Gong, Lewis Center, OH (US); Jason Kantola, Klamath Falls, OR (US); Paul Hemingfield, Charlotte, NC (US); Franklin Rolles, Charlotte, NC (US); Qingzheng Cheng, Charlotte, NC (US); David Yagla, Klamath Falls, OR (US); Shawn Laskoski, Charlotte, NC (US); Neal Hambleton, Charlotte, NC (US)

(73) Assignee: JELD-WEN, Inc.

( * ) Notice: Subject to any disclaimer, the term of this patent is extended or adjusted under 35 U.S.C. 154(b) by 554 days.

(21) Appl. No.: 17/813,823

(22) Filed: Jul. 20, 2022

(65) Prior Publication Data

US 2024/0025799 A1   Jan. 25, 2024

(51) Int. Cl.
*C03C 27/06* (2006.01)
*C03C 8/24* (2006.01)

(52) U.S. Cl.
CPC ............... *C03C 8/24* (2013.01); *C03C 27/06* (2013.01)

(58) Field of Classification Search
None
See application file for complete search history.

(56) References Cited

U.S. PATENT DOCUMENTS 4,347,326 A * 8/1982 Iwami ............... C03C 11/007
  106/602
8,936,850 B2 * 1/2015 Wang ................. C03C 3/091
  264/43

(Continued)

FOREIGN PATENT DOCUMENTS

CN     106430986 A   *  2/2017
DE  DD-251967 A1   * 12/1987

(Continued)

OTHER PUBLICATIONS

Cohrssen, Barbara, Patty's Industrial Hygiene, vol. 3—Physical and Biological Agents, 2021, John Wiley & Sons, 7th Edition, p. 125 (1st paragraph under section 6.7.5.1 under "Absorptive Materials" (Year: 2021).*

*Primary Examiner* — Alison L Hindenlang
(74) *Attorney, Agent, or Firm* — Ingrassia Fisher & Lorenz, LLP

(57) ABSTRACT

Sealants, vacuum insulated glazing (VIG) units having seals formed from the sealants, and methods for producing the VIG units using the sealants are provided. The sealants include a mixture of glass materials in powder form, a foaming agent in powder form, and a carrier medium. The foaming agent includes carbon black, carbide(s), or a combination thereof. The glass materials have compositions including: 50 to 70 wt. % $SiO_2$; 1 to 7 wt. % CaO; 0 to 7 wt. % MgO; 0 to 6 wt. % $Al_2O_3$; 1 to 6 wt. % $Fe_2O_3$ or FeO; 0 to 7 wt. % $TiO_2$; 0 to 16 wt. % $R_2O$, wherein R is chosen from the group consisting of Li, Na, K, or a combination thereof; 0 to 1 wt. % $SO_3$; 0 to 2 wt. % MnO; and 0 to 6 wt. % SrO+BaO.

7 Claims, 8 Drawing Sheets

(56) References Cited

U.S. PATENT DOCUMENTS

| | | | |
|---|---|---|---|
| 9,593,527 B2* | 3/2017 | Hogan | C03B 27/012 |
| 10,259,740 B2* | 4/2019 | Miyake | C03C 27/06 |
| 2020/0056421 A1* | 2/2020 | De Rycke | E06B 3/66314 |
| 2021/0147291 A1* | 5/2021 | Nonaka | C03C 27/06 |
| 2021/0221727 A1* | 7/2021 | Verlaak | C03B 25/04 |

FOREIGN PATENT DOCUMENTS

| | | | | |
|---|---|---|---|---|
| DK | 1978199 T3 | | 9/2016 | |
| EP | 0771313 B1 | | 10/2000 | |
| JP | 2009280475 A | * | 12/2009 | |
| KR | 20090059710 A | * | 6/2009 | C03C 3/078 |
| RU | 2176219 C1 | * | 11/2001 | |
| WO | WO-2012144334 A1 | * | 10/2012 | C03C 12/00 |

\* cited by examiner

METHODS, VACUUM INSULATED GLAZING UNITS PRODUCED THEREBY, AND SEALANTS

TECHNICAL FIELD

The present invention generally relates to vacuum insulated glazing (VIG) units and methods for producing VIG units, and more particularly relates to sealants that include mixtures of glass materials, VIG units having seals formed from the sealants, and methods for producing the VIG units using the sealants.

BACKGROUND

A fenestration unit may include a frame (e.g., a rectangular frame) that supports one or more other members of the unit. For example, a panel of the fenestration unit (e.g., an active panel of a slider door or a window unit) may include a frame that supports a glazing unit, a door skin, or other component of the panel. For fenestration units having transparent panels such as windows, glass doors, sidelites, skylites, etc., vacuum insulated glazing (VIG) units are generally much more efficient insulators than conventional dual pane non-vacuum insulated glazing units.

Manufacturing processes for producing VIG units can be time-consuming and energy-intensive, which in turn has resulted in significantly higher costs associated with VIG units relative to, for example, conventional dual pane non-vacuum insulated glazing units, thereby hindering the widespread acceptance of VIG units.

Hence, there is a need for a manufacturing process that is capable of producing VIG units in a manner that is time-saving and cost-efficient. There is also a need for a manufacturing process for VIG units that provides energy and cost savings. Other desirable features and characteristics of the present disclosure will become apparent from the subsequent detailed description and the appended claims, taken in conjunction with the accompanying drawings and this background discussion.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a sealant includes a mixture of glass materials in powder form, a foaming agent in powder form, and a carrier medium. The foaming agent includes carbon black, carbide(s), or a combination thereof. The glass materials have compositions including:

50 to 70 wt. % $SiO_2$;
1 to 7 wt. % CaO;
0 to 7 wt. % MgO;
0 to 6 wt. % $Al_2O_3$;
1 to 6 wt. % $Fe_2O_3$ or FeO;
0 to 7 wt. % $TiO_2$;
0 to 16 wt. % $R_2O$, wherein R is chosen from the group consisting of Li, Na, K, or a combination thereof;
0 to 1 wt. % $SO_3$;
0 to 2 wt. % MnO; and
0 to 6 wt. % SrO+BaO.

In another embodiment, a vacuum insulated glazing unit includes: a first pane, a second pane, a seal between the first pane to the second pane along and adjacent perimeters thereof, and support pillars fixed in positions between the first pane and the second pane. A hermetically sealed intermediate space is defined between the first pane and the second pane, wherein the intermediate space comprises a low-pressure environment therein. The seal is formed by sintering a sealant comprising a mixture of glass materials in powder form, a foaming agent in powder form, and a carrier medium, wherein the foaming agent comprises carbon black, carbide(s), or a combination thereof, wherein the glass materials have compositions including:

50 to 70 wt. % $SiO_2$;
1 to 7 wt. % CaO;
0 to 7 wt. % MgO;
0 to 6 wt. % $Al_2O_3$;
1 to 6 wt. % $Fe_2O_3$ or FeO;
0 to 7 wt. % $TiO_2$;
0 to 16 wt. % $R_2O$, wherein R is chosen from the group consisting of Li, Na, K, or a combination thereof;
0 to 1 wt. % $SO_3$;
0 to 2 wt. % MnO; and
0 to 6 wt. % SrO+BaO.

In another embodiment, a method includes providing first glass substrate, applying a sealant to the first glass substrate adjacent to and along a perimeter of the first glass substrate, positioning a second glass substrate over the first glass substrate, and heating the sealant for a duration and at a temperature sufficient to sinter the sealant to form a seal having a porous structure between the first glass substrate and the second glass substrate. The sealant includes a mixture of glass materials in powder form, a foaming agent in powder form, and a carrier medium, wherein the foaming agent comprises carbon black, carbide(s), or a combination thereof, wherein the glass materials have compositions including:

50 to 70 wt. % $SiO_2$;
1 to 7 wt. % CaO;
0 to 7 wt. % MgO;
0 to 6 wt. % $Al_2O_3$;
1 to 6 wt. % $Fe_2O_3$ or FeO;
0 to 7 wt. % $TiO_2$;
0 to 16 wt. % $R_2O$, wherein R is chosen from the group consisting of Li, Na, K, or a combination thereof;
0 to 1 wt. % $SO_3$;
0 to 2 wt. % MnO; and
0 to 6 wt. % SrO+BaO.

Furthermore, other desirable features and characteristics of the method and vacuum insulated glazing units will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
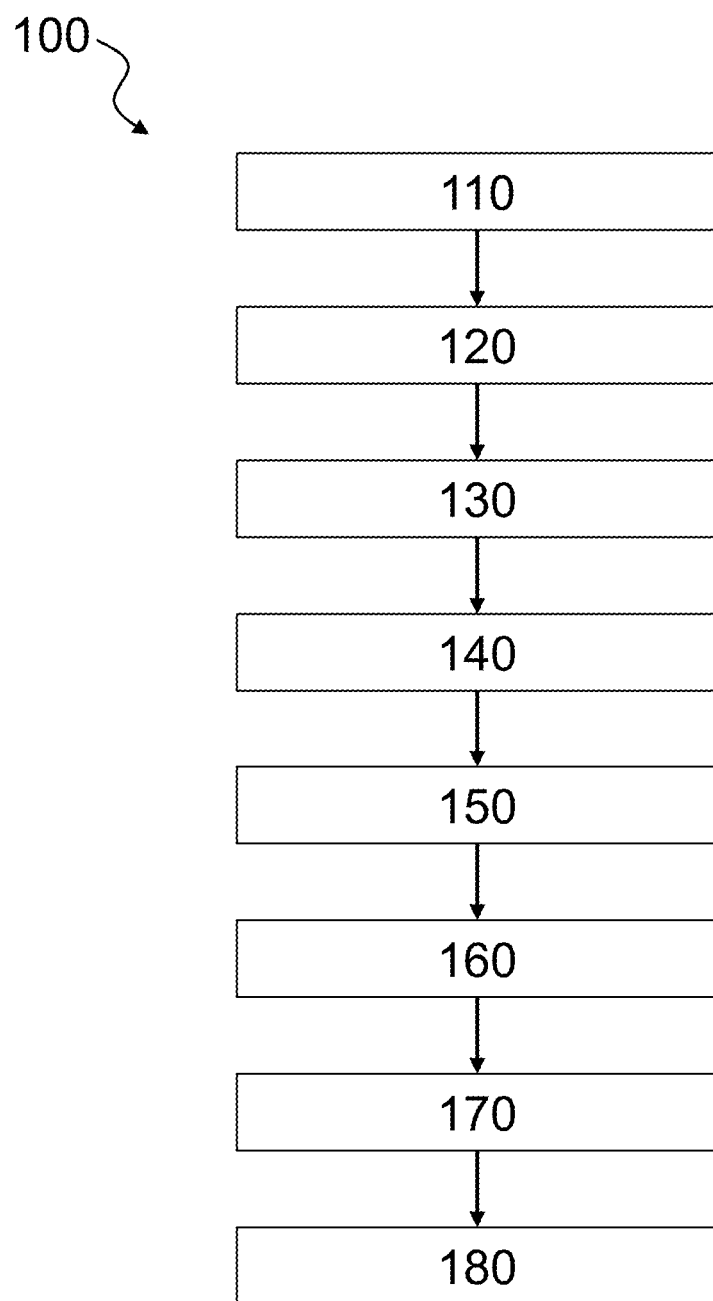
FIG. 1 is a flowchart of a method for fabrication of a vacuum insulated glazing (VIG) unit according to example embodiments of the present disclosure.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments herein are directed to methods for manufacturing vacuum insulated glazing (VIG) units, including VIG units comprising curved panes, in a rapid, efficient, and cost-reducing manner. The methods include hermetically joining a pair of panes by locally sintered one or more glass comprising sealants located therebetween. In some examples, the sealant(s) are locally heated and sintered via irradiation with a continuous or pulsed laser beam. In some examples, a low-pressure environment is produced between the panes by an evacuation process that utilizes an evacuation port located along an edge of the VIG unit between the panes, rather than a typical evacuation port that provides a passage through one of the panes. Some embodiments provide vacuum pump heads configured specifically for use in edge-located evacuation processes such as those described herein. In some examples, compositions are provided for the sealant(s) that allow for improved performance, printing-based deposition, and/or controlled porosity, including open porosity for use in getter materials and closed porosity for improved thermal insulation.

The VIG units may be configured to be installed in various products, such as but not limited to certain fenestration units such as windows, glass doors, sidelites, skylites, etc. The fenestration units may include a frame (e.g., a rectangular frame) that supports the VIG unit and, optionally, one or more other members of the unit. For examples in which the VIG units are curved, the VIG units may be particularly beneficial for applications such as automotive windows.

Although the methods are discussed in reference to manufacturing VIG units, such descriptions are not limiting. Aspects of the methods may be used to produce other products that include vacuum-sealed compartments having low-pressure environments maintained therein. In some examples, the methods be used to produce vacuum insulated panels or components formed of materials other than glass, including certain polymeric, metallic, ceramic, and/or composite materials. Specific but nonlimited product examples include certain potable liquid and food containers including thermos bottles, water bottles, coffee mugs, and lunch boxes, refrigeration appliances (residential and commercial), and medical and transport containers.

Figure 10:
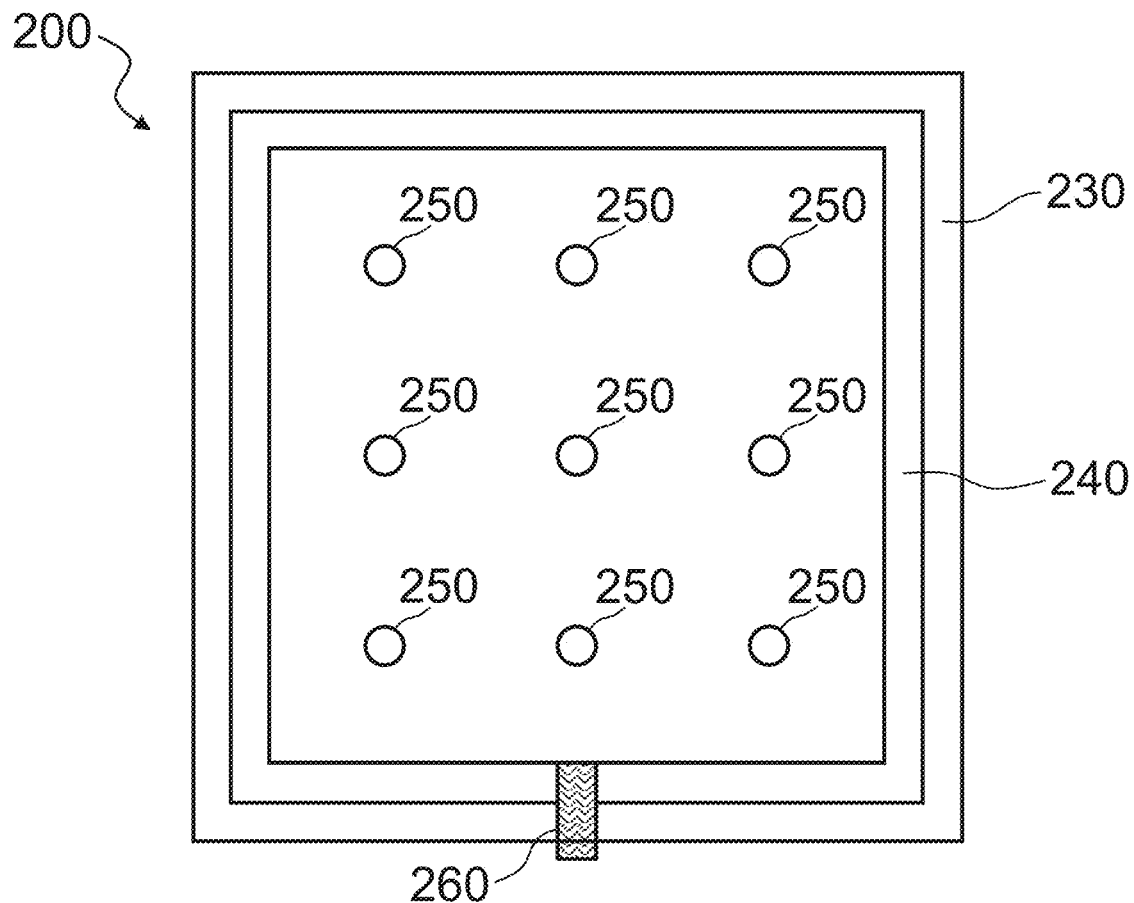
FIG. 10 is a top view of a vacuum insulated glazing unit according to example embodiments of the present disclosure.
Figure 11:
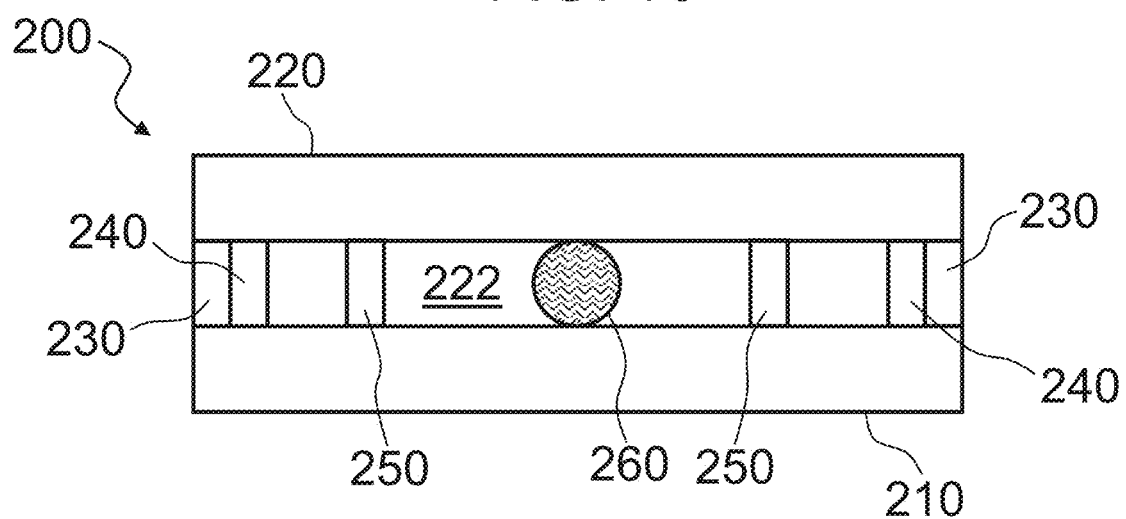
FIG. 11 is a side view of the vacuum insulated glazing unit of FIG. 10.

Referring now to FIG. 1, a nonlimiting example of a method, referred to hereinafter as the method 100, is presented that includes steps suitable for production of a VIG unit. For convenience, the method 100 will be discussed in reference to an exemplary VIG unit 200. However, the VIG unit 200 is nonlimiting and the method 100 may be used to produce VIG units having various shapes, sizes, and/or components. FIGS. 2 through 7 illustrate stages during the method 100 of producing the VIG unit 200, and FIGS. 10 and 11 present the VIG unit 200 upon completion of the method 100.

In step 110, the method 100 includes providing a first pane 210 (i.e., substrate, sheet, etc.) and, if necessary, preparing the first pane 210, for example, by cleaning and edge finishing processes. These cleaning and edge finishing processes are well known in the art and will not be discussed in detail herein. In some examples, the first pane 210 may have a substantially planar body. In other examples, the first pane 210 may have a body having one or more curved surfaces.

Figure 2:
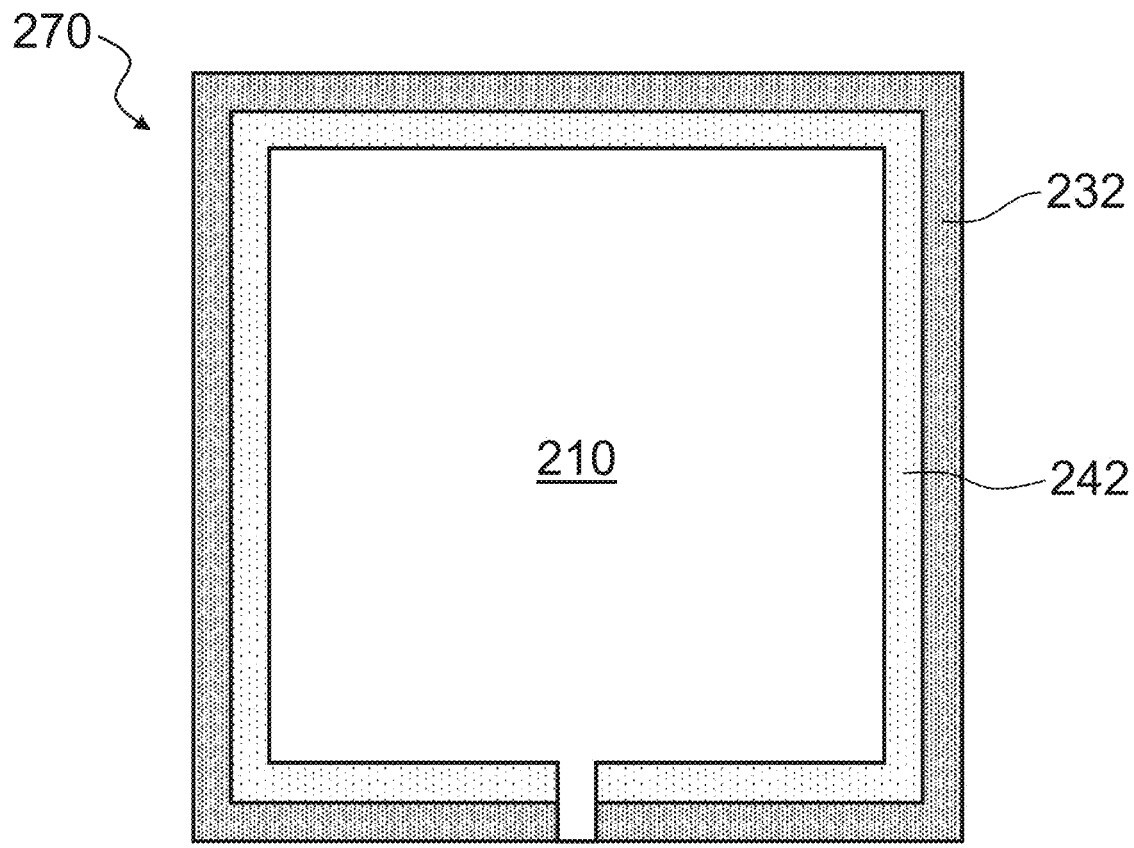
FIG. 2 is a top view of a first intermediate assembly produced by certain steps of the method of FIG. 1.
Figure 3:
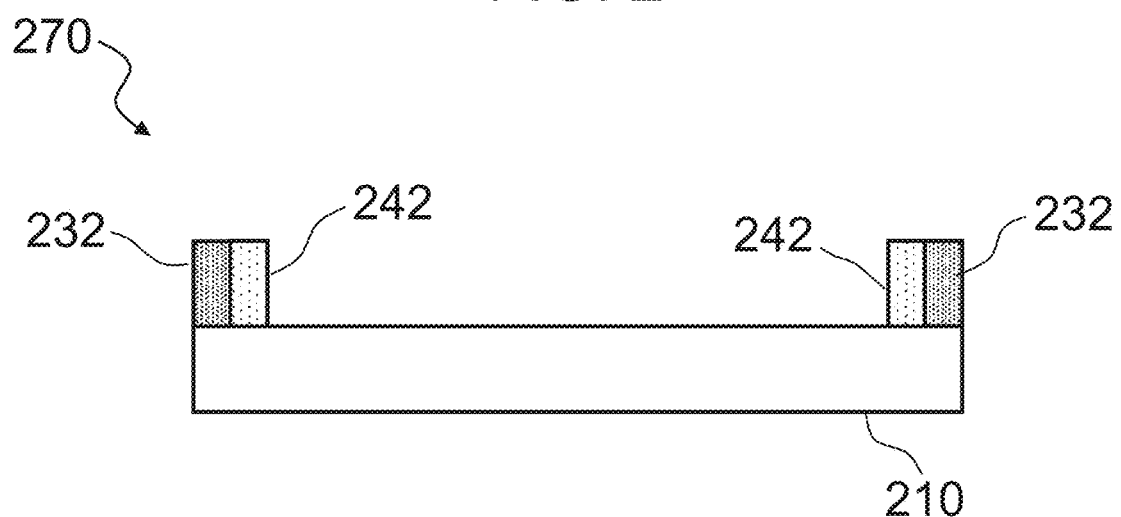
FIG. 3 is a side view of the first intermediate assembly of FIG. 2.

In step 120, the method 100 includes applying a primary sealant 232 and a secondary sealant 242 to surfaces of the first pane 210. Each of the primary sealant 232 and the secondary sealant 242 may be deposited in manners to individually define paths adjacent to and along a perimeter of the first pane 210 with the primary sealant 232 surrounding the secondary sealant 242. The paths of the primary sealant 232 and the secondary sealant 242 may be continuous about the perimeter of the first pane 210 with an exception for a space for an evacuation port at an edge of the first pane 210. FIGS. 2 and 3 represent a first intermediate assembly 270 at the completion of step 120. In this nonlimiting example, the first pane 210 has a planar, rectangular body and the primary sealant 232 and the secondary sealant 242 have been deposited about the perimeter thereof.

Various processes may be used for application of the primary sealant 232 and the secondary sealant 242. Exemplary application processes may include screen printing, ink jet printing, and digital printing processes. In such examples, the primary sealant 232 and the secondary sealant 242 may have forms that are sufficiently flowable as to be readily printable while sufficiently stable to remain in place during subsequent steps of the method 100. For example, the primary sealant 232 and the secondary sealant 242 may have forms of certain pastes, gels, high-viscosity inks, or the like. In some examples, the primary sealant 232 and the secondary sealant 242 may have viscosities of greater than 5 centipoise, greater than 50 centipoise, or greater than 500 centipoise.

In step 130, the method 100 includes positioning support pillars 250 (i.e., spacers) on the first pane 210 within boundaries defined by the secondary sealant 242. In some examples, the pillars 250 may be arranged in a predetermined pattern to define an array on the first pane 210. Optionally, the pillars 250 may be secured to the first pane 210.

In step 140, the method 100 includes preparing the evacuation port by positioning an evacuation tube 260 on the first pane 210 at the location designated for the evacuation port, that is, the space where the primary sealant 232 and the secondary sealant 242 were not deposited. Optionally, the evacuation tube 260 may be secured to the first pane 210. In this example, the evacuation tube 260 has an elongated, tubular body with a passage therethrough and a pair of oppositely disposed opening on ends thereof providing access to the passage. However, this structure of the evacuation tube 260 is nonlimiting. For example, the evacuation tube 260 could have a rectangular cross-section.

In some examples, the evacuation tube 260 does not pass through or penetrate either of the first pane 210 or the second pane 220 as is typical of evacuation ports but instead passes between the first pane 210 and the second pane 220. For example, the evacuation tube 260 may be located on the first pane 210 such that a side of the evacuation tube 260 is in contact with a face of the first pane 210 such that a longitudinal axis of the passage of the evacuation tube 260 is substantially parallel to adjacent surfaces of the first pane 210. In examples such as these wherein the first pane 210 is planar, the longitudinal axis of the passage may be parallel to a central geometric plane defined by the face of the first pane 210.

Figure 4:
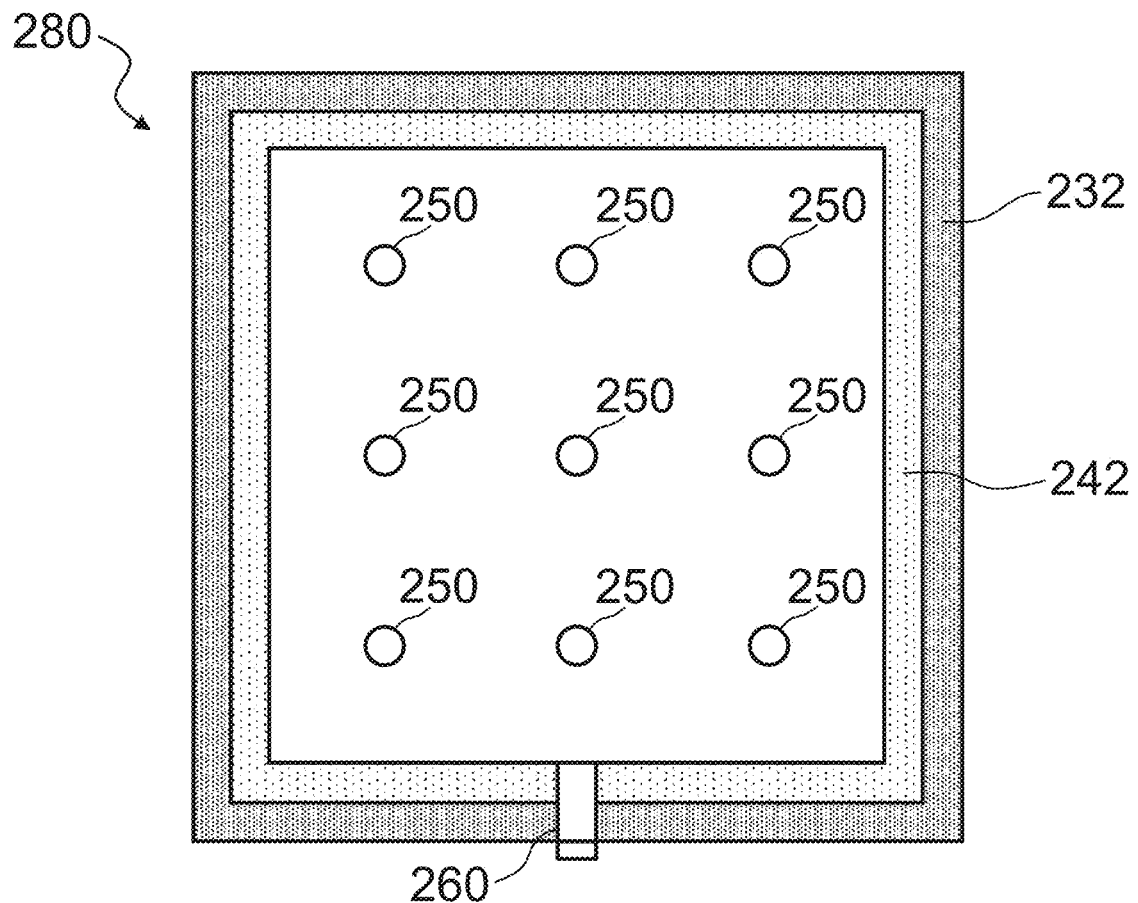
FIG. 4 is a top view of a second intermediate assembly produced by certain steps of the method of FIG. 1.
Figure 5:
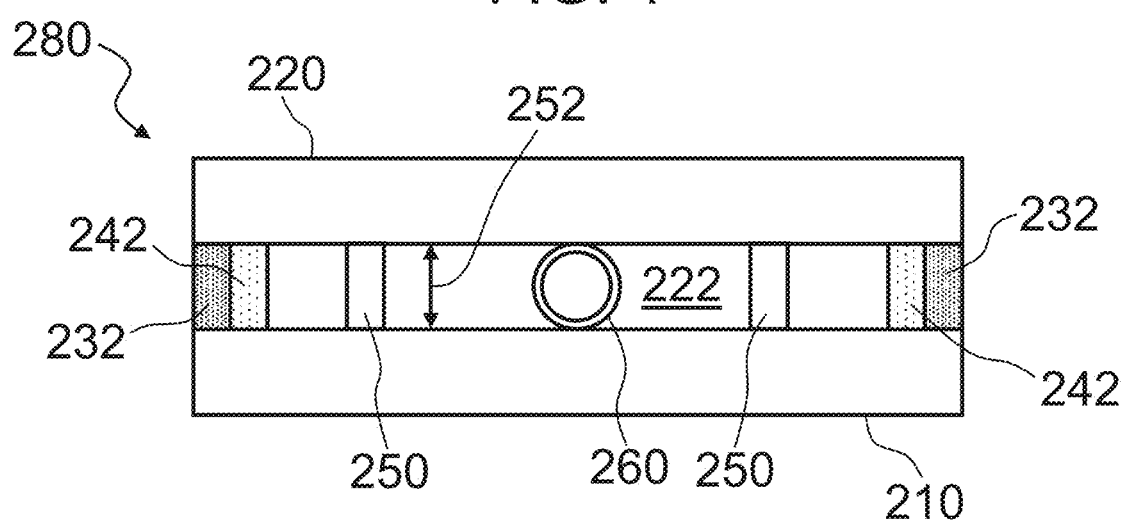
FIG. 5 is a side view of the second intermediate assembly of FIG. 4.

Once the pillars 250 and the evacuation tube 260 have been located on the first pane 210, the method 100 may include locating a second pane 220 (i.e., substrate, sheet, etc.) on the pillars 250 such that the second pane 220 contacts the pillars 250, the primary sealant 232, the evacuation tube 260, and, optionally, the secondary sealant 242 in step 150. The pillars 250 and/or the evacuation tube 260 may be fixed in position between the first pane 210 and the second pane 220, for example, due to compression and/or friction resulting from contact with the first pane 210 and the second pane 220. An intermediate space 222 is defined between the first pane 210 and the second pane 220 having a dimension therebetween corresponding to a dimension 252 of the pillars 250. FIGS. 4 and 5 represent a second intermediate assembly 280 at the completion of step 150. In this nonlimiting example, the second pane 220 is substantially identical to the first pane 210 and the pillars 250 have be arranged in a uniform array with equal spacing therebetween. Some of the pillars 250 are omitted from FIGS. 5, 7, and 11 for clarity.

Figure 6:
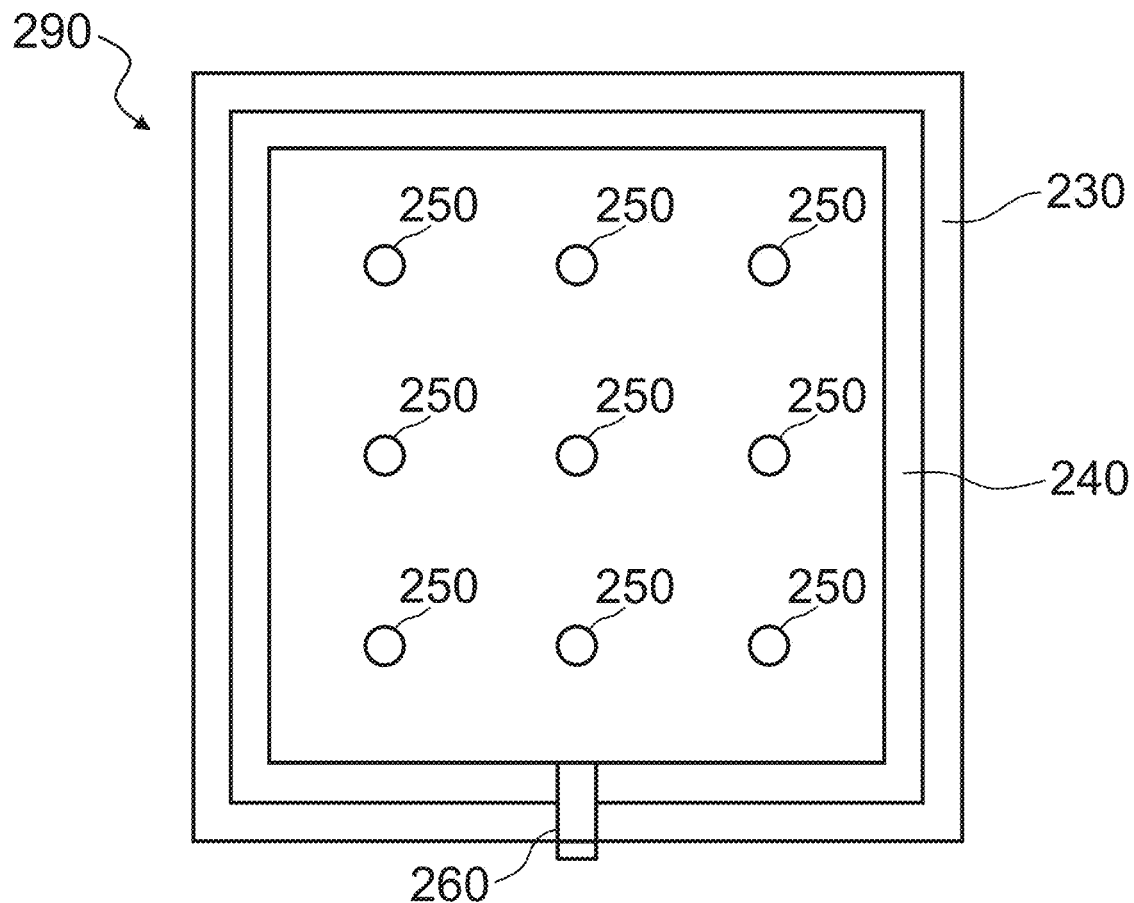
FIG. 6 is a top view of a third intermediate assembly produced by certain steps of the method of FIG. 1.
Figure 7:
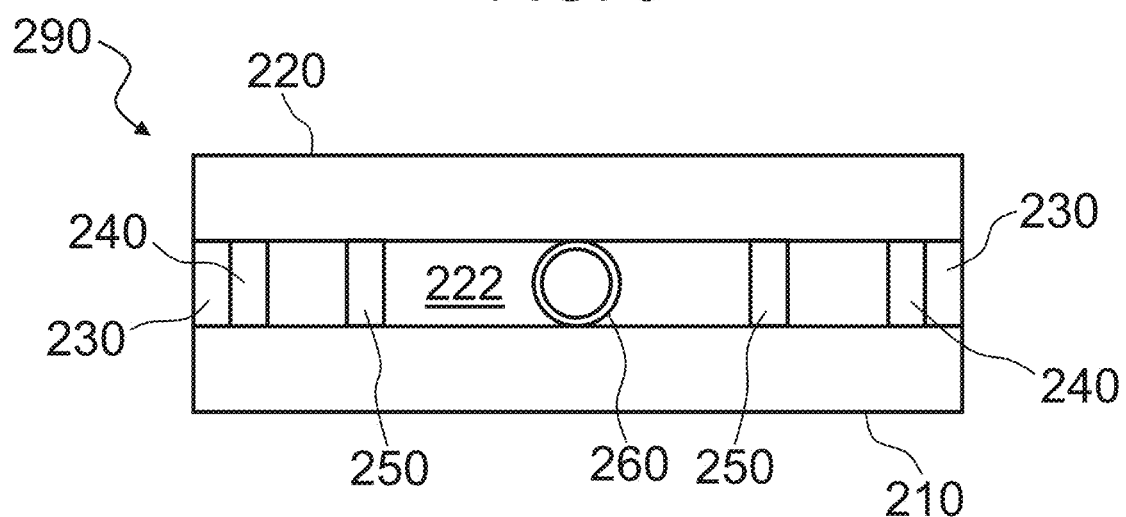
FIG. 7 is a side view of the third intermediate assembly of FIG. 6.

In step 160, the method 100 may include heating the primary sealant 232 and the secondary sealant 242 for a duration and at a temperature sufficient to incinerate any organic components thereof and sinter the glass materials thereof to form a primary seal 230 and a secondary seal 240, respectively, about the perimeter of the first pane 210 and the second pane 220. The primary seal 230 and the secondary seal 240 are formed of the glass materials of the primary sealant 232 and the secondary sealant 242, respectively. During the sintering process, at least some of the glass materials of the primary sealant 232 bond with the adjacent surfaces of the first pane 210 and the second pane 220 such that the first pane 210 and the second pane 220 are joined. FIGS. 6 and 7 represent a third intermediate assembly 290 at the completion of step 160.

In some examples, the primary seal 230 may provide structural rigidity/integrity between the first pane 210 and the second pane 220, that is, the primary seal 230 may function as the sole physical joint between the first pane 210 and the second pane 220. In some examples, the primary seal 230 provides hermeticity between the first pane 210 and the second pane 220, that is, the primary seal 230 provides a vacuum-tight, fluid-tight seal about the perimeter of the first pane 210 and the second pane 220 with the exception of the space comprising the evacuation tube 260. In some examples, the primary seal 230 may provide a weather resistant seal about the perimeter of the first pane 210 and the second pane 220 with the exception of the space comprising the evacuation tube 260. The primary seal 230 may have a low-porosity structure or a closed pore structure.

In some examples, the secondary seal 240 may include an open pore structure and therefore may function as a getter material within the intermediate space 222. That is, the secondary seal 240 may function to passively absorb or bind with certain residual impurities (e.g., moisture) that may remain within the intermediate space 222 after the evacuation process (described hereinafter) has been completed. In such examples, the secondary seal 240 may be provided as an alternative to or in addition to a typical chemical getter material.

Once the sintering process is complete, the evacuation tube 260 may provide the only fluidic access to the intermediate space 222. Specifically, the first opening of the evacuation tube 260 is fluidically open to the intermediate space 222, the second opening of the evacuation tube 260 is open to an exterior environment outside of the intermediate space 222, and the primary seal 230 fluidically seals the remainder of the perimeter of the third intermediate assembly 290.

The primary sealant 232 and the secondary sealant 242 may be heated and sintered using various heating processes. In some examples, the second intermediate assembly 280 may be heated in an elevated temperature environment, such as in an oven. In other examples, the primary sealant 232 and the secondary sealant 242 may be locally heated to temperatures sufficient to cause sintering. In some examples, the primary sealant 232 and the secondary sealant 242 may be locally heated by irradiation with a continuous or pulsed laser beam. For example, a pulsed laser beam generated from a laser source may be scanned over the primary sealant 232 and the secondary sealant 242 at a scan rate and at an intensity sufficient to cause sintering of the primary sealant 232 and the secondary sealant 242. The pulsed laser beam may be scanned over the primary sealant 232 and the secondary sealant 242 individually or simultaneously, and the pulsed laser beam may be scanned over the primary sealant 232 and the secondary sealant 242 one or more times. In certain examples, the laser-sintering process may be performed in an open environment. In some examples, the laser-sintering process may be performed in an environment maintained at substantially room temperature (i.e., 15 to 25° C.).

For examples in which the primary sealant 232 and the secondary sealant 242 are irradiated with a pulsed laser beam, the pulsed laser beam may have a pulse time duration (e.g., a temporal width of a pulse wavepacket) of 100 picoseconds or less, for example, 10 picoseconds or less. In some examples, the pulsed laser beam may have a pulse time duration of less than one picosecond, for example, 500 femtoseconds or less, 350 femtoseconds or less, or 50 femtoseconds or less. The laser source may be, for example, a Ti:sapphire oscillator or a ytterbium fiber laser source. The pulsed laser beam may have a wavelength of about 690 nm to 1053 nm, a peak power of greater than 10,000 W, such as greater than 20,000 W at 10 MHz, a repetition rate of about 1 to 1000 MHz, and a pulse energy of greater than 3 nJ with 100 femtosecond duration.

In step 170, the method 100 includes producing a low-pressure environment in the intermediate space 222 between the first pane 210, the second pane 220, and the primary seal 230. In certain examples, the low-pressure environment may be produced by securing a vacuum pump head to an edge of the third intermediate assembly 290 such that the vacuum pump head forms a seal about the second opening of the evacuation tube 260 such that the intermediate space 222 is in fluidic communication with the chamber via the evacuation tube 260. A vacuum hose may be used to couple the vacuum pump head to a vacuum pump which may be operated to evacuate the intermediate space 222 through the evacuation tube 260. In this manner, gases, moisture, and other substances may be drawn and removed from the intermediate space 222 thereby producing the low-pressure environment. In some examples, the low-pressure environment of the intermediate space 222 may have a pressure of about 0.1 Pa or less, such as 0.05 Pa or less. Notably, a sufficient quantity of the pillars 250 should be located on the first pane 210 in step 130 to maintain separation of the first pane 210 and the second pane 220 under forces applied thereto due to the low-pressure environment.

In step 180, the method 100 includes sealing the evacuation tube 260 such that the intermediate space 222 is hermetically sealed, and the low-pressure environment is maintained therein. In some examples, the evacuation tube 260 may be sealed by irradiation from a laser source sufficient to melt the evacuation tube 260. After removal of the applied heat and subsequent solidification of the evacuation tube 260, a passage through the evacuation tube 260 may be closed and the intermediate space 222 may be sealed to define the VIG unit 200. In some examples, the laser source may be of the same type as used to sinter the primary sealant 232 and the secondary sealant 242. In other examples, the laser source may be a different type of laser source. Therefore, in some examples the laser source may generate a pulsed laser beam and in other examples the laser source may generate a continuous laser beam. Alternatively, or in addition to the above, the evacuation tube 260 may be sealed with a sealing device, such as a cap.

Figure 8:
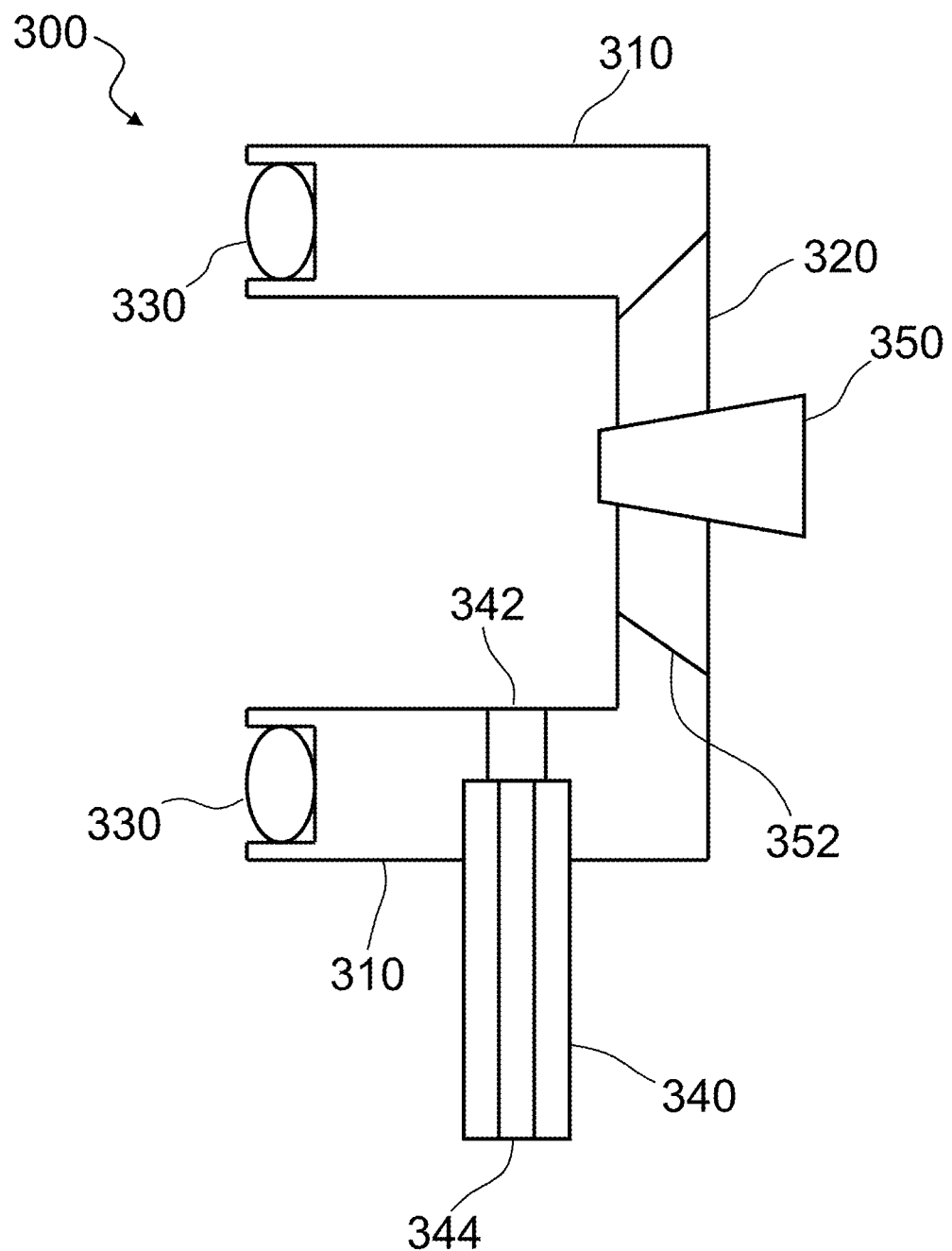
FIG. 8 is a cross-sectional side view of a vacuum pump head according to example embodiments of the present disclosure.

FIG. 8 presents a cross-sectional view of an exemplary vacuum pump head 300 suitable for use with the method 100 discussed above. That is, the vacuum pump head 300 is configured to secure to and provide a vacuum-tight seal at an edge of the third intermediate assembly 290, or another pre-evacuated VIG unit having an evacuation port protruding from an edge thereof. In this example, the vacuum pump head 300 includes a body having a generally cylindrical shape that includes a sidewall 310 (e.g., circular cross-section) and a rear wall 320. Interior surfaces of the sidewall 310 and the rear wall 320 define an empty chamber therebetween and a distal end of the sidewall 310 opposite the rear wall 320 has edges that define an opening to the chamber. A circular, continuous, compressible sealing member 330 (e.g., a polymeric O-ring) is located at the distal end of the sidewall 310 that is configured to contact the edge of the third intermediate assembly 290 such that the opening to the chamber is entirely covered by edge surfaces of the third intermediate assembly 290 and provide a substantially uniform vacuum-tight coupling thereto during operation of a vacuum pump 370 coupled to the vacuum pump head 300 via a vacuum hose 380.

A vacuum hose port 340 located at the sidewall 310 includes an inlet 342, an outlet 344, and a passage therebetween, and is configured to provide fluidic access to the chamber through the passage. The vacuum hose port 340 may be configured to releasably couple to the vacuum hose 380. With this configuration, the vacuum pump head 300 is configured to provide a vacuum-tight seal about the evacuation tube 260 while the vacuum pump 370 is operated to evacuate the gases and other substances from the intermediate space 222 of the third intermediate assembly 290.

The vacuum pump head 300 is configured to allow the evacuation tube 260 to be sealed while the vacuum pump head 300, in combination with the vacuum pump 370, maintains a low-pressure environment within the chamber and therefore about the second opening of the evacuation tube 260. In the represented example, the vacuum pump head 300 includes a laser source 350 configured to generate a laser beam and direct the laser beam through the chamber to irradiate and thereby seal the evacuation tube 260. In other examples, the vacuum pump head 300 may include an aperture configured to allow access of a laser beam generated by an independent laser source into the chamber such that the laser beam is directed to irradiate the evacuation tube 260. For example, the rear wall 320 may include an aperture that is vacuum sealed with a transparent material wherein the transparent material is configured to allow unimpeded passage of the laser beam therethrough.

Figure 9:
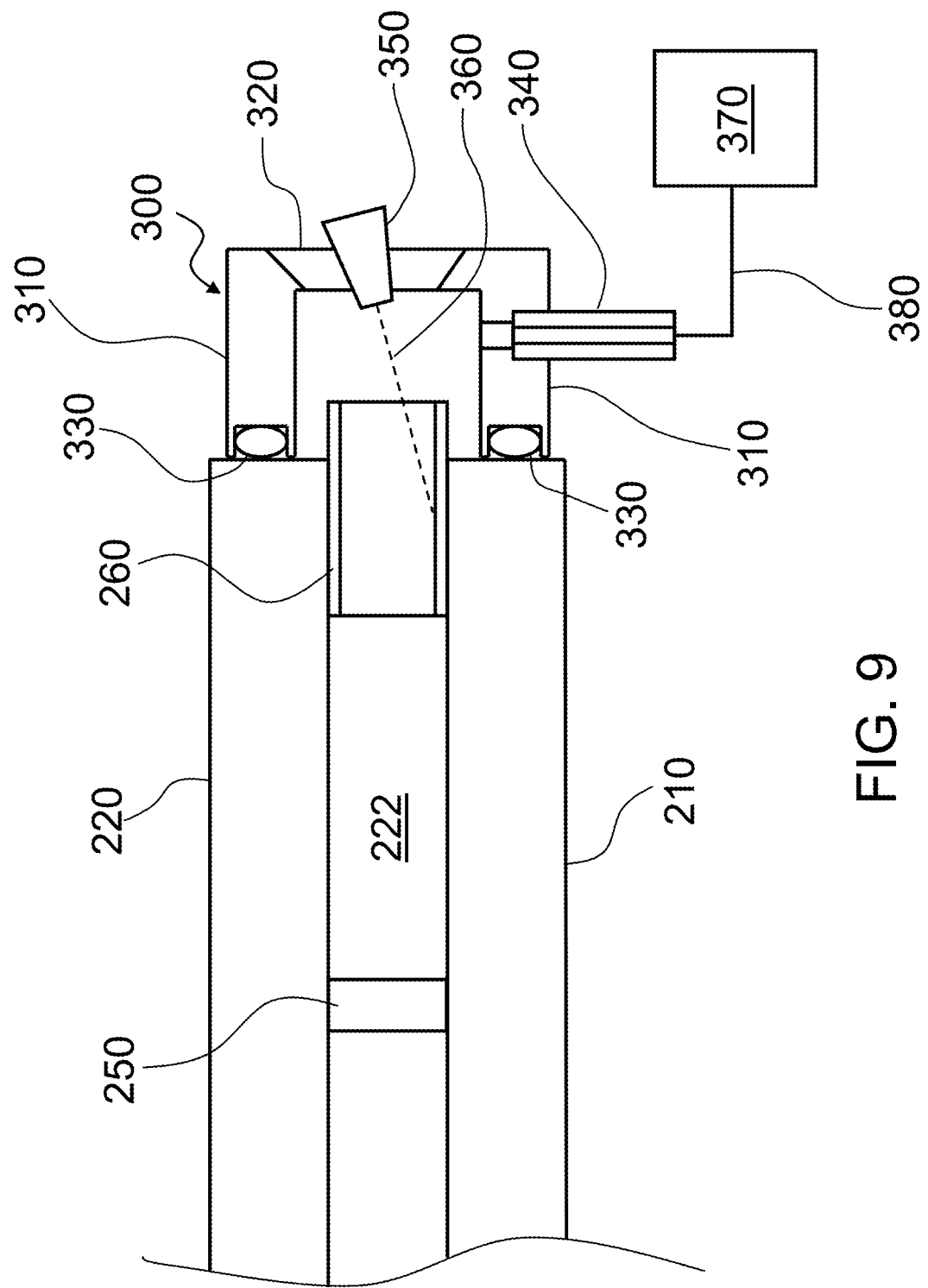
FIG. 9 is a partial, cross-sectional view of the vacuum pump head of FIG. 8 secured to an end of the third intermediate assembly of FIGS. 6 and 7.

FIG. 9 presents the vacuum pump head 300 as secured to the edge of the third intermediate assembly 290. It should be noted that the various components of the vacuum pump head 300 and the third intermediate assembly 290 are not necessarily to scale. FIG. 9 illustrates the laser source 350 as generating and directing a laser beam 360 that irradiates the evacuation tube 260 to melt and seal the evacuation tube 260. In some examples, the laser source 350 may be configured to be articulated relative to the body of the vacuum pump head 300 (e.g., moveably supported by or coupled to the body) to provide a capability of aiming and focusing the laser beam 360 toward various surfaces of the evacuation tube 260. For example, the rear wall 320 may include an articulating or rotating portion 352. In some examples, the laser beam 360 may be secured in a fixed position configured to be aligned with the evacuation tube 260 upon coupling of the vacuum pump head 300 with the intermediate assembly 290.

FIGS. 10 and 11 present the VIG unit 200 after completion of the method 100. As represented, the evacuation tube 260 is sealed such that the low-pressure environment is maintained within the intermediate space 222. The VIG unit 200 and its components may have various dimensions. In curtain examples, the first pane 210 and the second pane 220 may be about 4.0 mm thick or less, the primary seal 230 may be about 0.5 mm thick or less, and the pillars 250 may be about 3 to 4 mm thick (resulting in the dimension 252 being about 3 to 4 mm).

The VIG unit 200 and its components may include various materials. In some examples, the first pane 210 and/or the second pane 220 may be formed of soda-lime-silicate glasses. In some examples, the first pane 210 and/or the second pane 220 may be tempered glass materials. As used herein, tempered glass includes heat or chemically treated glass having a minimum surface compressive stress of about 69 megapascals (10,000 psi) or greater. In some examples, the tempered glass may be considered a safety glass with a minimum surface compressive stress of greater than 100 megapascals (15,000 psi). In some examples, the first pane 210 and/or the second pane 220 may have glass transition temperature ($T_g$) values of about 573° C. or more and/or coefficient of thermal expansion (CTE) values of about $100 \times 10^{-7}/°C$ or less, such as $85 \times 10^{-7}/°C$ to $100 \times 10^{-7}/°C$.

The primary sealant 232 may include various compositions configured to provide the primary seal 230. In some examples, the primary sealant 232 may be a mixture comprising at least one glass material, and optionally other components, mixed in a carrier medium. Suitable but nonlimiting carrier mediums may include water-based organic mediums and oil-based organic mediums. Exemplary glass material(s) may include certain aluminosilicate glasses, borosilicate glasses, aluminoborosilicate glasses, lithium telluride silicate glasses, bismuthsilicate glasses, and alkali barium silicate glasses. In some examples, the glass material(s) may have compositions that include, by weight percent, 0 to 55 wt. % $Bi_2O_3$, 10 to 65 wt. % $SiO_2$, 1 to 10 wt. % $Al_2O_3$, 10 to 30 wt. % $R_2O$ (R=Li, Na, K, or a combination thereof), 0.01 to 20 wt. % of RO (R=Ca, Mg, or a combination thereof), 2 to 15 wt. % of BaO, 0 to 5 wt. % $TeO_2$, 0.01 to 20 wt. % of $Fe_2O_3$ or FeO, 2 to 30 wt. % of $B_2O_3$, 0.1 to 2 wt. % of $P_2O_5$, 0.1 to 2 wt. % of ZnO, 0.1 to 2 wt. % of CuO or $Cu_2O$, and/or trace amounts of Mn, Mo, Cl, Se, Cd, W and/or other metals or metal oxides. As used herein, trace amounts of a material may include concentrations of less than about 0.05 wt. %. The compositions may further include incidental impurities.

In certain examples, the primary sealant 232 may be configured and processed to produce the primary seal 230 with a closed pore structure having sufficient porosity to substantially increase insulation properties of the primary seal 230 relative to a comparable seal formed of the one or more glass materials and having a low-porosity structure. In such examples, the primary sealant 232 may be a mixture comprising the at least one glass material and at least one foaming agent mixed in the carrier medium. Suitable carrier medium and glass materials include those noted previously. Other exemplary glass materials may have compositions that include, by weight percent, 50 to 70 wt. % $SiO_2$, 1 to 7 wt. % CaO, 0 to 7 wt. % MgO, 0 to 6 wt. % $Al_2O_3$, 1 to 6 wt. % $Fe_2O_3$ or FeO, 0 to 7 wt. % $TiO_2$, 0 to 16 wt. % $R_2O$ (R=Li, Na, K, or a combination thereof), 0 to 1 wt. % $SO_3$, 0 to 2 wt. % MnO, 0 to 6 wt. % SrO+BaO, and/or trace amounts of Cd, Se, Te, W, and/or P. Suitable but nonlimiting foaming agents may include carbon black or certain carbides. The compositions may further include incidental impurities.

The primary sealant 232 may be produced by, for example, melting one or more bulk glass materials, quenching the bulk glass material(s), and then fritting/grinding the bulk glass material(s) into a fine glass powder or powder mixture. In some examples, the glass powder may have a particle size distribution of D50 less than 10 micron. If a primary seal 230 with a closed porosity is intended to be produced, the glass powder may be mixed with the foaming agent(s) in powder form to define a powder mixture. In such examples, the powder mixture may include 0 to 5 wt. % of the foaming agent(s). In some examples, a powder mixture comprising greater than 5 wt. % of the foaming agent(s) may be friable. The glass powder or powder mixture may then be mixed with the carrier medium and any other components of the mixture.

The secondary sealant 242 may include various compositions configured to provide the secondary seal 240 with an open pore structure having sufficient porosity to substantially increase absorption properties of the secondary seal 240 relative to a comparable seal formed of the one or more glass materials and having a low-porosity structure. In some examples, the secondary sealant 242 may be a mixture comprising at least one glass material, at least one foaming agent, and optionally other components, mixed in a carrier medium. Suitable but nonlimiting carrier mediums may include water-based organic medium and oil-based organic medium. An exemplary glass material may include certain alkali silicate glasses, for example, with sulfate and iron therein. Suitable but nonlimiting glass materials may have compositions that include, by weight percent, 50 to 70 wt. % $SiO_2$, 1 to 7 wt. % CaO, 0 to 7 wt. % MgO, 0 to 6 wt. % $Al_2O_3$, 1 to 6 wt. % $Fe_2O_3$ or FeO, 0 to 7 wt. % $TiO_2$, 0 to 16 wt. % $R_2O$ (R=Li, Na, K, or a combination thereof), 0 to 1 wt. % $SO_3$, 0 to 2 wt. % MnO, 0 to 6 wt. % SrO+BaO, and/or trace amounts of Cd, Se, Te, W, and/or P. Suitable but nonlimiting foaming agents may include certain carbonates such as, but not limited to, sodium carbonates and potassium carbonates. The compositions may further include incidental impurities.

The secondary sealant 242 may be produced by, for example, melting the glass material(s), quenching the glass material(s), and then fritting/grinding the glass material(s) into a fine glass powder or powder mixture. In some examples, the glass powder may have a particle size distribution of D50 less than 10 micron. The glass powder may be mixed with the foaming agent(s) in powder form to define a powder mixture. The powder mixture may include 0 to 5 wt. % of the foaming agent(s). The powder mixture may then be mixed with the carrier medium and any other components of the mixture.

In some examples, the primary sealant 232 and the secondary sealant 242 may include one or more glass materials having the same or different compositions. For example, the primary sealant 232 may have a first glass material that has a first composition, and the secondary sealant 242 may have a second glass material that has a second composition, and the first composition and the second composition may be the same or may be different.

The evacuation tube 260 may have various shapes and sizes and may be formed of various materials. Exemplary materials for the evacuation tube 260 may include certain aluminosilicate glasses, borosilicate glasses, aluminoborosilicate glasses. In some examples, the material may have a composition that includes, by weight percent, 0 to 55 wt. % $Bi_2O_3$, 10 to 65 wt. % $SiO_2$, 1 to 10 wt. % $Al_2O_3$, 10 to 30 wt. % $R_2O$ (R=Li, Na, K, or a combination thereof), 0.01 to 20 wt. % of RO (R=Ca, Mg, or a combination thereof), 2 to 15 wt. % of BaO, 0 to 5 wt. % $TeO_2$, 0.01 to 20 wt. % of $Fe_2O_3$ or FeO, 2 to 30 wt. % of $B_2O_3$, 0.1 to 2 wt. % of $P_2O_5$, 0.1 to 2 wt. % of ZnO, 0.1 to 2 wt. % of CuO or $Cu_2O$, and/or trace amounts of Mn, Mo, Cl, Se, Cd, W and/or other metals or metal oxides. The composition may further include incidental impurities.

In certain examples, the first pane 210, the second pane 220, the primary sealant 232 (and therefore the primary seal 230), and the evacuation tube 260 have compatible coefficient of thermal expansion (CTE) values. As used herein, the phrase compatible CTE values may refer to CTE values that are within 5% of each other. Optionally, the secondary sealant 242 (and therefore the secondary seal 240) may also have a compatible CTE value. In these examples, the compatible CTE values may reduce the likelihood of detachment of the components due to temperature change. In some examples, the first pane 210, the second pane 220, the glass material(s) of the primary sealant 232 (and therefore the primary seal 230), the evacuation tube 260, and, optionally, the glass material(s) of the secondary sealant 242 (and therefore the secondary seal 240) have CTE values that are the same or within substantially the same (e.g., within 5 wt. % of each other). In some examples, the first pane 210, the second pane 220, the glass material(s) of the primary sealant 232 (and therefore the primary seal 230), the evacuation tube 260, and/or, optionally, the glass material(s) of the secondary sealant 242 (and therefore the secondary seal 240) have CTE values of $100 \times 10^{-7}/°$ C. or less, such as $85 \times 10^{-7}/°$ C. to $100 \times 10^{-7}/°$ C.

In certain examples, the primary sealant 232, the secondary sealant 242, and the evacuation tube 260 have glass transition temperature ($T_g$) values that are less than the $T_g$ value of the first pane 210 and the second pane 220. This arrangement may allow for the primary sealant 232 and the secondary sealant 242 to be sintered and the evacuation tube 260 sealed by local heating without de-tempering the first pane 210 and the second pane 220. In some examples, the glass material(s) of the primary sealant 232, the secondary sealant 242, and/or the evacuation tube 260 have $T_g$ values of 573° C. or less, such as 500° C. or less.

In view of the foregoing, it is foreseeable that compositions of one or more of the first pane 210, the second pane 220, the primary sealant 232, the secondary sealant 242, and the evacuation tube 260 may be selected, in part, based on glass transition temperature ($T_g$) and/or coefficient of thermal expansion (CTE) values.

Figure 12:
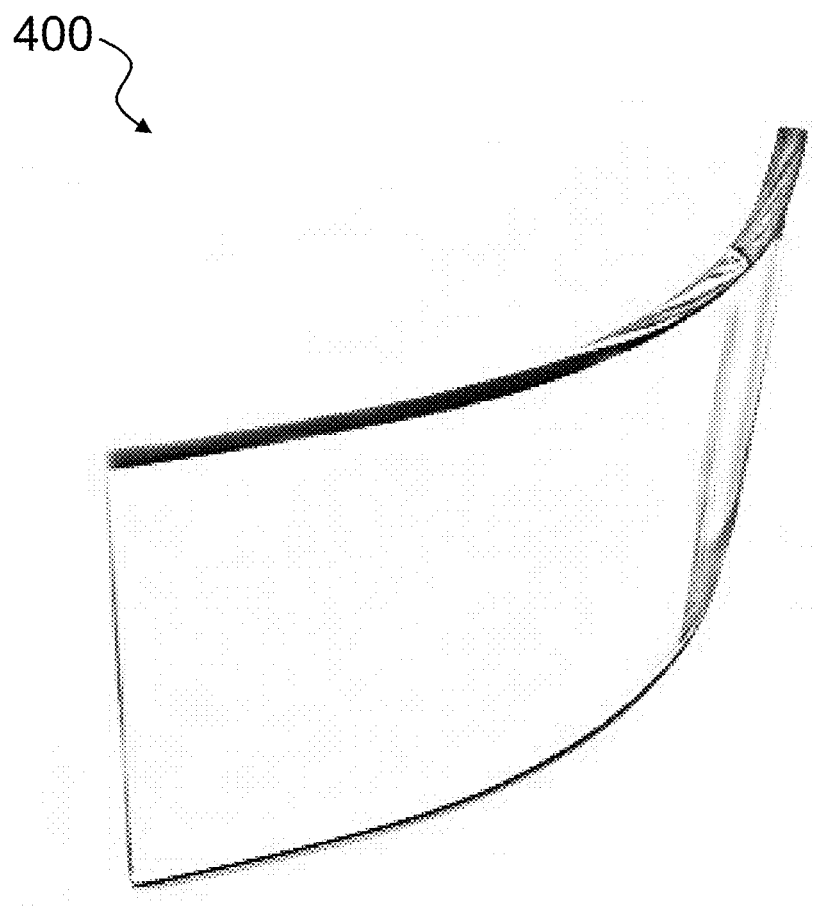
FIG. 12 is a perspective view of a curved vacuum insulated glazing unit according to example embodiments of the present disclosure.

The method 100 provides the capability to produce VIG units, including VIG units comprising curved panes, in a manner that promotes efficiency, high throughput rates, and reduce manufacturing costs due to the aforementioned rapid sintering process and edge-based evacuation process. The resulting VIG units may have improvements in performance during operation thereof and/or improvements in aesthetic appearance (e.g., due to omission of evacuation ports that are typically located through one of the panes). FIG. 12 presents a nonlimiting example of a curved VIG 400.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method comprising:
   providing first glass substrate;
   applying a primary sealant to the first glass substrate adjacent to and along a perimeter of the first glass substrate;
   applying a secondary sealant to the first glass substrate adjacent to the primary sealant and along a perimeter of the first glass substrate, wherein the secondary sealant is surrounded by the primary sealant;
   positioning a second glass substrate over the first glass substrate with the primary sealant and the secondary sealant therebetween;
   heating the primary sealant for a duration and at a temperature sufficient to sinter the primary sealant to form a primary seal including a first glass material between the first glass substrate and the second glass substrate, wherein the primary seal has a closed pore structure; and
   heating the secondary sealant for a duration and at a temperature sufficient to sinter the secondary sealant to form a secondary seal including a second glass material between the first glass substrate and the second glass substrate, wherein the secondary seal has an open pore structure,
   wherein the primary sealant includes a first mixture of one or more glass materials in powder form, a first foaming agent in powder form, and a first carrier medium,
   wherein the secondary sealant comprises a second mixture of one or more glass materials in powder form, a second foaming agent in powder form, and a carrier medium, wherein the second foaming agent comprises carbon black, one or more carbides, one or more carbonates, or a combination thereof, and wherein the one or more glass materials of the second mixture have compositions comprising:
   50 to 70 wt. % $SiO_2$;
   1 to 7 wt. % CaO;
   0 to 7 wt. % MgO;
   0 to 6 wt. % $Al_2O_3$;
   1 to 6 wt. % $Fe_2O_3$ or FeO;
   0 to 7 wt. % $TiO_2$;
   0 to 16 wt. % $R_2O$, wherein R is chosen from a group consisting of Li, Na, K, or a combination thereof;
   0 to 1 wt. % $SO_3$;
   0 to 2 wt. % MnO; and
   0 to 6 wt. % SrO+BaO.

2. The method of claim 1, wherein an intermediate space is defined between the first glass substrate, the second glass substrate, the primary seal, and an evacuation tube, wherein the evacuation tube provides fluidic access to the intermediate space from an exterior environment, the method comprising:
   evacuating the intermediate space via the evacuation tube to produce a low-pressure environment within the intermediate space; and
   sealing the evacuation tube to hermetically seal the intermediate space and maintain the low-pressure environment therein,
   wherein the secondary seal is located within the intermediate space and configured to function therein as a getter material due to the open pore structure.

3. The method of claim 1, further comprising:
prior to positioning the second glass substrate over the first glass substrate:
  positioning support pillars on the first glass substrate; and
  positioning an evacuation tube on the first glass substrate, wherein positioning the second glass substrate over the first glass substrate disposes the support pillars and the evacuation tube between the first glass substrate and the second glass substrate; and
after heating the primary sealant to form the primary seal and heating the secondary sealant to form the secondary seal:
  evacuating an intermediate space defined between the first glass substrate, the second glass substrate, the primary seal, and the evacuation tube to produce a low-pressure environment in the intermediate space by drawing gas from the intermediate space through the evacuation tube; and
  sealing the evacuation tube to hermetically seal the intermediate space and maintain the low-pressure environment therein.

4. The method of claim 3, wherein evacuating the intermediate space includes securing a vacuum pump to an edge of the first glass substrate and the second glass substrate and forming a vacuum-tight seal about an opening of the evacuation tube.

5. The method of claim 1, wherein the first glass material has a first composition and the second glass material has a second composition, wherein the first composition and the second composition are different.

6. The method of claim 1, wherein heating the primary sealant and heating the secondary sealant includes irradiating both of the primary sealant and the secondary sealant with a pulsed laser beam in an open environment maintained at a temperature of 15 to 25° C.

7. The method of claim 1, wherein the one or more glass materials of the first mixture have compositions comprising:
  0 to 55 wt. % $Bi_2O_3$;
  10 to 65 wt. % $SiO_2$;
  1 to 10 wt. % $Al_2O_3$;
  10 to 30 wt. % $R_2O$, wherein R is chosen from a group consisting of Li, Na, K, or a combination thereof,
  0.01 to 20 wt. % of RO, wherein R is chosen from a group consisting of Ca, Mg, or a combination thereof;
  2 to 15 wt. % of BaO;
  0 to 5 wt. % $TeO_2$;
  0.01 to 20 wt. % of $Fe_2O_3$ or FeO;
  2 to 30 wt. % of $B_2O_3$;
  0.1 to 2 wt. % of $P_2O_5$;
  0.1 to 2 wt. % of ZnO; and
  0.1 to 2 wt. % of CuO or $Cu_2O$.

* * * * *